Patented Aug. 15, 1939

2,169,872

UNITED STATES PATENT OFFICE 2,169,872

LIQUID HALOGENATED COMPOSITIONS

Frank M. Clark, Pittsfield, Mass., and Walter M. Kutz, Pittsburgh, Pa., assignors to General Electric Company, a corporation of New York No Drawing. Application September 3, 1938, Serial No. 228,396

11 Claims. (Cl. 252—1)

The present invention comprises new and improved liquid compositions which are suitable for insulating and dielectric purposes in various electric devices. Our new compositions are characterized by advantageous low temperature properties, such as low congealing temperature, inhibited crystal formation, and low viscosity, and hence may be used advantageously under conditions subjecting them to low natural ambient temperatures. The present application is a continuation-in-part of my application Serial No. 88,387, filed July 1, 1936.

Our invention applies with particular utility to electric devices, such as capacitors, cables, transformers, and the like. In such devices it is highly desirable that a liquid impregnating or cooling material should not be subjected to a change of state (e. g., liquid to solid) in the range of low natural temperatures which such apparatus normally may be expected to encounter. Preferably, cooling liquids should be wholly free from crystals at all times. It is also desirable that such impregnants should possess fireproof characteristics, this desirability applying event to gases which are evolved when such liquids are decomposed by an electric arc.

Fireproof liquids which heretofore have been used, or have been suggested for use, as cooling and dielectric media in electrical apparatus, have been found to be restricted in their scope of usefulness because solidification of the fireproof materials occurred during idle periods within the normal range of ambient temperatures, or because their rapidly increasing viscosity at temperatures below room temperature rendered operation of the apparatus inefficient.

For high dielectric constant impregnants for capacitors and other devices requiring the greatest constancy of electrical capacity over a wide range of temperature, partial or complete solidification of the impregnant as may occur during winter, with accompanying reduction or loss of electric capacity, constitutes a serious limitation.

In the case of electric cables containing impregnated paper, solidification of the impregnant promotes void formation with resultant ionization under voltage and eventual electrical breakdown.

In transformers, high viscosity and crystal formation, even though only partial, lead to decreased efficiency of circulation of a cooling fluid. As transformer cooling liquids are circulated in restricted ducts, crystals formed in such liquids at low temperatures may clog the ducts and prevent circulation. Mixtures of chlorinated diphenyl and chlorinated benzene, which will remain sufficiently liquid to be capable of being poured at —45° C., will have crystals formed therein when subjected to a temperature of —20° C. or thereabouts for two or three days. When the exposure to crystal-forming temperature is continued for six days or more (the time varying with the proportions), complete solidification occurs. This obviously is undesirable as an apparatus in which a cooling liquid has become solidified is likely to be damaged if put into operation while this condition exists.

We have discovered that certain tetrachlorbenzenes when added in substantial proportion to materials subject to slow solidification above the short time pour point function efficiently as an "antifreeze" whereby the slow solidification temperature is lowered. Such antifreeze not only lowers the congelation temperature and reduces or prevents crystal formation above such temperature, but also materially reduces the viscosity at low temperatures. For practical purposes we prefer to employ an isomer of tetrachlorbenzene having a melting point not materially in excess of about 50° C., and in particular the isomer of tetrachlorbenzene known as the 1,2,3,4 isomer. The latter is a solid melting at about 45 to 46° C. The 1,2,3,5 isomer of terachlorbenzene may be used in place of the 1,2,3,4 isomer. It melts at about 50 to 51° C.

At least about 10 per cent of tetrachlorbenzene chosen from the group consisting of the 1,2,3,4 and 1,2,3,5 isomers should be present in liquid compositions to obtain the full benefits of our invention.

Our invention embodies in its broadest aspect the combination of tetrahalogen substitution products of benzene with halogenated organic liquid compositions which tend to become wholly or partly crystallized or solidified at low temperatures, including halogenated forms of benzene, such as trichlorbenzene, halogenated polyphenyls, such as chlorinated compounds of diphenyl, diphenyl oxide, diphenyl methane, diphenyl ketone, diphenyl benzene; also halogenated condensed nuclear compounds, such as chlorinated naphthalene, halogenated compounds of straight chain (aliphatic) hydrocarbons, such as chlorinated paraffins and olefins, and other halogenated materials. Such materials preferably are employed as compositions comprising three or more components, one of which is a tetrahalogen benzene compound.

Our invention may be best understood from the following illustrative examples, included among which are two-component compositions as well as preferred compositions containing a greater number of components.

Example 1

One exemplification of the beneficial effect produced by 1,2,3,4 tetrachlorbenzene in a two-component composition is its combination with chlorinated diphenyl alone.

(a) As obtained commercially and ordinarily used as a dielectric liquid, pentachlor diphenyl consists as a mixture of its isomers. It has an A. S. T. M. pour point of about 10° C., and solidifies with about a 25 per cent loss of electrical capacity when exposed to temperatures from 0 to +5° C.

The addition of a suitable isomer of tetrachlorbenzene materially depresses this pour point. For example, a mixture containing by weight 25 to 30 per cent of the tetrachlorbenzene (1,2,3,4 isomer) and 75 to 70 per cent of the pentachlor diphenyl is characterized by lower viscosity than pentachlor diphenyl unassociated with tetrachlorbenzene, by a pour point at least as low as −9° C., and by a congelation or solidification point of still lower value. When such a mixture is held at about −7° C. for about 14 days, no crystal formation occurs and the viscosity is retained at approximately the same value as of pentachlor diphenyl at 25° C. unassociated with the tetrachlorbenzene isomer. The change is reflected in a more stable dielectric constant at these low temperature values.

(b) A further illustration of the effect of 1,2,3,4 tetrachlorbenzene on the low temperature characteristics of chlorinated diphenyl alone is its combination with chlorinated diphenyl containing 60 per cent chlorine by weight. The latter material is a semi-solid, non-crystalline material at ordinary temperatures with a pour point of about 30° C., and consists of a mixture of isomers. A mixture of 75 per cent of chlorinated diphenyl (60 per cent chlorine) and 25 per cent of 1,2,3,4 tetrachlorbenzene has a pour point of about −5° C. The viscosity of this mixture is lower than the viscosity of the chlorinated diphenyl of 60 per cent chlorine content.

*Example 2*

When pentachlor diphenyl oxide, as a mixture of its isomers, is blended with 1,2,3,4 tetrachlorbenzene, a decided lowering in viscosity and decrease in pour point results. A mixture containing 75 per cent by weight of the pentachlor diphenyl oxide and 25 per cent of the 1,2,3,4 tetrachlorbenzene has a pour point of about −10° C. This is a reduction of about 12° C. due to the presence of the tetrachlorbenzene.

*Example 3*

Ordinary commercial trichlorbenzene (which consists of a mixture of isomers) becomes congealed or solidified at temperatures within a range of about +5° to +10° C.

(a) When about 80 parts of such isomeric mixture by weight are admixed with about 20 parts by weight of 1,2,3,4 tetrachlorbenzene, the resulting composition may be held for five days at a temperature of −7° C. before solidification occurs.

(b) A composition consisting by weight of 70 parts trichlorbenzene (isomeric mixture) and 30 parts of the 1,2,3,4 tetrachlorbenzene may be held at −7° C. for 15 days without crystal formation, the viscosity throughout this period being about 100 seconds Saybolt.

*Example 4*

Tetrachlor ethylene, an olefin compound, solidifies at about −19° C. The solidifying temperature may be lowered by the addition of tetrachlorbenzene. A composition made up of 93 parts by weight of tetrachlor ethylene and 7 parts by weight of trichlorbenzene begins to solidify when cooled to about −30° C., complete solidification occurring in one to two days. When the trichlorbenzene is replaced by 1,2,3,4 tetrachlorbenzene, no crystal formation occurs at −30° C. even after prolonged periods of exposure. Solidification of such a mixture only occurred when the temperature was lowered for prolonged periods to −35° C.

Even greater advantages result when our invention is exemplified in compositions comprising at least three components (one of which is a tetrahalogen compound of benzene).

*Example 5*

(a) Tetrachlorbenzotrifluoride has a melting point of about 26° C. When 10 per cent of 1,2,3,4 $C_6H_2Cl_4$ was added thereto, a liquid material was obtained having a pour point of +19° C., 20 per cent addition resulted in a liquid material having a viscosity of approximately 100 seconds Saybolt which, when held at −7° C., showed some crystal separation but did not solidify.

(b) Trichlorbenzotrifluoride behaves similarly.

*Example 6*

(a) Dichlorbenzyl cyanide is a liquid with a pour point of about −35° C. When exposed to −25° C. for two days, complete solidification occurs, that is, the long-time solidification temperature is ten degrees higher than the short-time solidification or pour point temperature. When tetrachlorbenzene is added to such material, the pour point and the long-time solidification temperatures are lowered. For example, a mixture by weight of 80 parts of dichlorbenzyl cyanide and 20 parts of 1,2,3,4 tetrachlorbenzene has a pour point of −40° C., and when exposed to −25° C. for four days, or longer, only slight crystal formation occurs and the material retained its low viscosity, which was about 500 seconds Saybolt.

*Example 7*

Pentachlordiphenyl benzoate is a semi-solid with a pour point of about 30° C. When 1,2,3,4 tetrachlorbenzene is added, the pour point is progressively reduced, for example, for a 15 per cent addition of tetrachlorbenzene being 15° C., for a 30 per cent addition being 0° C., for a 40 per cent addition −18° C., and for a 50 per cent addition being −25° C.

*Example 8*

Pentachlor diphenyl ketone is a semi-solid with a flow point of −15° C. When 1,2,3,4 tetrachlorbenzene is added the flow point is materially reduced. For example, a 30 per cent addition lowers the flow point to −10° C.

*Example 9*

Mixtures of chlorinated diphenyl and trichlorbenzene as set forth in Clark Patent No. 1,931,373 remain liquid for short periods down to extremely low temperatures. A mixture containing approximately equal parts of chlorinated diphenyl (60 per cent chlorine content) and trichlorbenzene is liquid at about −45° to −50° C., which may be termed the short-time flow point. However, long continued exposure to low temperatures tends to produce solidification of this mixture. Such an equal-parts mixture becomes solidified in about two days at −25° C., which may be termed the long-time solidification temperature.

(a) If 10 parts of trichlorbenzene are replaced by 10 parts of tetrachlorbenzene (1,2,3,4 isomer), the resultig composition will have a viscosity at −25° C. of about 500 seconds Saybolt Universal, a pour point of about −36° C., and will remain liquid at −25° C. without solidifying for an indefinite period longer than five days.

(b) Still further improvements in low temperature liquidity can be obtained by increasing the content of 1,2,3,4 tetrachlorbenzene. A mixture by weight of 45 parts chlordiphenyl (60 per cent chlorine), 40 parts trichlorbenzene, and 15 parts 1,2,3,4 tetrachlorbenzene has a short-time pour point of about −46° C., a viscosity at −15° C. of 400 seconds, and upon exposure to −25° C., the composition remains liquid for at least 15 days without crystal formation.

Even at −30° C. the latter composition has formed in it only a small percentage of floating crystals after six to ten days' continuous exposure. This preferred composition is free from all dangerous crystallization and solidification characteristics manifested in other mixtures in which 1,2,3,4 tetrachlorbenzene is absent.

(c) A mixture consisting by weight of 40 parts of chlorinated diphenyl (60 per cent chlorine), 40 parts of trichlorbenzene, and 20 parts of the 1,2,3,4 isomer of tetrachlorbenzene ($C_6H_2Cl_4$) has a pour point (A. S. T. M.) of about −48° C. At a temperature as low as −26° C., this composition has a viscosity of only about 600 centipoise.

While in the mixtures containing the above proportions our invention is most advantageously exemplified, its advantages may be obtained in a mixture containing lesser amounts of the 1,2,3,4 isomer of tetrachlorbenzene.

For comparison purposes, it is to be noted that a mixture by weight of 60 parts chlorinated diphenyl (60 per cent chlorine) and 40 parts trichlorbenzene has at −20° C. a viscosity of about 1100 centipoise. At −24° C. the viscosity of the latter mixture is about 2900 centipoise. Its pour point is about −36° C. At −20° C. this mixture becomes solidified in five to ten days.

(d) Mixtures containing in place of the 60 per cent chlordiphenyl other forms of chlorinated diphenyl, such as pentachlordiphenyl or heptachlordiphenyl, are similarly improved in their low temperature characteristics by the addition of suitable amounts of tetrachlorbenzene.

*Example 10*

Chlorinated naphthalene, as stated in Clark Patent No. 1,999,004, when added to other chlorinated hydrocarbons reduces their pour point characteristic but crystallization still occurs. For example, a composition consisting by weight of 38 parts of hexachlordiphenyl methane, 22 parts of tetrachlornaphthalene, and 40 parts of trichlorbenzene (mixture of isomers) when held at −25° C. for three days results in the formation of about 3 per cent of crystals, the amount of crystal formation continuing with time until the liquid mixture becomes wholly solidified in 15 days. The viscosity of this three-component mixture at −25° C. the first day is about 2850 seconds Saybolt.

(a) When to 90 parts by weight of this mixture about 10 parts of 1,2,3,4 tetrachlorbenzene are added, the mixture remains liquid at −25° C. for 18 days without crystal formation. This four-component mixture has a viscosity of about 2350 seconds Saybolt when cooled for one day to −25° C. The viscosity remains substantially unchanged during the entire period of 18 days.

(b) A mixture of 85 parts by weight of the initial three-component mixture and 15 parts of tetrachlorbenzene has still lower viscosity, being about 1900 seconds Saybolt at the end of 18 days, and no crystal formation being observable.

(c) Another illustration of the advantageous anti-freeze properties of tetrachlorbenzene is exemplified in compositions containing chlorinated diphenyl in place of chlorinated diphenyl methane.

The following mixture has excellent low temperature characteristics, but will show crystal formation after about one day of exposure to −25° C., the crystallization continuing with time, the entire mass being solid in 18 days:

| | Per cent |
|---|---|
| Chlorinated diphenyl (60% Cl) | 38 |
| Trichlorbenzene | 40 |
| Tetrachlornaphthalene | 22 |

When, however, about 10 to 15 per cent of 1,2,3,4 tetrachlorbenzene is added to this composition, no crystals are formed even by the end of 18 days.

The percentage of tetrachlorbenzene may be increased to 20 per cent, but 15 per cent addition is preferred. The viscosity of an 85:15 mixture in one day at −25° C. is 1400 seconds, and in 15 days is 1800 seconds Saybolt.

*Example 11*

A mixture of 45 parts chlorinated diphenyl oxide (60 per cent Cl) and 55 parts of trichlorbenzene (isomeric), although possessing excellent short-time, low temperature characteristics, when exposed to −25° C. becomes wholly solidified in about one day. When 15 parts of the trichlorbenzene in this mixture are replaced by an equal amount by weight of 1,2,3,4 tetrachlorbenzene, then even after prolonged exposure to −25° C. no crystallization occurs.

*Example 12*

Pentachlor diphenyl ketone at room temperature is a resinous semi-solid melting at about 35° C. A mixture by weight of 70 parts pentachlor diphenyl ketone and 30 parts of trichlorbenzene has a pour point of about −10° C. The addition of tetrachlorbenzene reduces the pour point.

(a) The following composition has a pour point of −28° C. and may be exposed for prolonged periods of time to −25° C. without crystal formation:

| | Parts by weight |
|---|---|
| Pentachlor diphenyl ketone | 49 |
| Trichlorbenzene (isomeric) | 30 |
| 1,2,3,4 tetrachlorbenzene | 21 |

(b) Another illustrative mixture, in which no crystallization occurs upon cooling for long periods to −25° C., is the following:

| | Parts by weight |
|---|---|
| Pentachlor diphenyl ketone | 49 |
| Trichlorbenzene | 21 |
| 1,2,3,4 tetrachlorbenzene | 30 |

*Example 13*

In a copending Clark application, Serial No. 228,382, filed September 3, 1938, are described chlorinated paraffin compositions containing 50 per cent and more of chlorine and preferably chlorine as high as 70 to 75 per cent. A chlorinated paraffin product containing such a high percentage of chlorine is a solid, the flow point of the product containing more than 70 per cent chlorine being about 100° C. When such a product is associated with trichlorbenzene in a proportional range of 40 to 65 per cent a liquid composition results, the pour point of which varies from about 11° C. to −10° C., the lower pour point corresponding to the larger percentage of trichlorbenzene. All such mixtures, when exposed for short periods (less than one day) to low temperatures above the pour point form crystalline solids. For example, a mixture consisting by weight of 65 per cent trichlorbenzene and 35 per cent of a chlorinated paraffin (75% Cl) becomes a solid crystalline mass in 24 hours.

(a) When, however, to 60 parts of such a mixture 40 parts of 1,2,3,4 tetrachlorbenzene is added, the resulting liquid has a pour point of −18° C. After ten days at −7° C. no crystallization occurred, the viscosity of the liquid being about 800 seconds Saybolt.

(b) A composition by weight of 70 parts of such a mixture (chlorinated paraffin and trichlorbenzene combined) and 30 parts of 1,2,3,4 tetrachlorbenzene, has a pour point of −22° C., and after ten days at −7° C. no crystallization had occurred, the viscosity being about 500 seconds Saybolt through this time.

While we prefer to use for purposes of our invention the 1,2,3,4 isomer, nearly as favorable results can be obtained with mixtures containing a corresponding amount of the 1,2,3,5 isomer. On the other hand, the isomer of tetrachlorbenzene, known as the 1,2,4,5 isomer, which has a melting point of about 140° C., is soluble only to the extent of a few per cent in chlorinated polyphenyls or mixtures containing such polyphenyl compounds, and therefore is not so well suited for the purposes of the present invention. It can, to the extent of a few per cent, be present in combination with other isomers of tetrachlorbenzene.

Example 14

For example, 70 parts by weight of trichlorbenzene (congealing at 10° C.) and 30 parts by weight of 1,2,3,5 tetrachlorbenzene (congealing at 50 to 51° C.) is a thin, non-viscous liquid with a pour point of about −6° C. in which crystal formation is inhibited.

Preferably the ingredients of mixtures for use in electrical devices should be so chosen that there is a balance of chlorine and hydrogen in the mixture so that upon decomposition of the material by an electric arc, or otherwise, only non-inflammable gases are evolved.

While our invention has been illustrated by a number of specific examples, it is not limited in its benefits to such examples. The examples include mixtures containing two, three, and four-components, one component in each case being tetrachlorbenzene. However, it should be understood that if desired compositions may be made up including (besides tetrachlorbenzene) a greater number of components while still obtaining a beneficial antifreeze and anticrystallizing effect due to the presence of the tetrachlorbenzene.

Various modifiers, snuffers, fixatives for decomposition products, and so forth may be added to compositions embodying our invention without losing the benefits resulting from such antifreeze and anticrystallizing agent. For example, snuffers, such as various chlorinated ethylenes, propylenes, and butylenes, may be added as described in Clark Patent No. 2,019,339; fixatives such as described in Clark Patents No. 2,105,406 and No. 2,105,407 may be added all within the scope of our present invention.

What we claim as new and desire to secure by Letters Patent of the United States is:

1. A composition the essential ingredients of which consist of liquid halogenated organic material which is subject to solidification at low temperatures within the range of natural ambient temperatures and a sufficiently large amount, greater than ten per cent, of tetrachlorbenzene which is soluble in said composition and opposes solidification.

2. A liquid composition containing as substantial and essential ingredients tetrachlorbenzene chosen from the group consisting of the 1,2,3,4 and 1,2,3,5 isomers and chlorinated hydrocarbon which when unassociated with said tetrachlor compound has a materially higher flow point than when associated with said compound.

3. A liquid composition the essential ingredients of which consist of chlorinated organic liquid material, the long-time solidification temperature of which is above the short-time flow point temperature and a sufficiently large admixture therewith of 1,2,3,4 tetrachlorbenzene to materially lower said slow solidification temperature.

4. A liquid composition consisting essentially of liquid chlorinated hydrocarbons which are subject to slow solidification above the short-time flow point temperature, and at least about ten per cent of tetrachlorbenzene chosen from the group consisting of the 1,2,3,4 and 1,2,3,5 isomers.

5. A composition comprising as preponderant ingredients a chlorine substitution compound of a hydrocarbon compound and about ten to forty per cent of the 1,2,3,4 isomer of tetrachlorbenzene, said composition having a lower congelation point and lower viscosity over a range of temperatures above the congelation point than said compound has when unassociated with said tetrachlorbenzene.

6. A composition comprising at least about forty per cent of chlorinated polyphenyl and about ten to forty per cent by weight of the 1,2,3,4 isomer of tetrachlorbenzene.

7. A liquid composition comprising chlorinated diphenyl containing from about fifty-four to sixty per cent of chlorine, a substantial proportion of trichlorbenzene, and at least about ten per cent of the 1,2,3,4 isomer of tetrachlorbenzene by weight.

8. A liquid composition comprising chlorinated diphenyl, trichlorbenzene, and at least about ten per cent of the 1,2,3,4 isomer of tetrachlorbenzene.

9. A liquid composition comprising by weight about forty-five parts of chlorinated diphenyl (60 per cent chlorine), about forty parts trichlorbenzene, and about fifteen parts of the 1,2,3,4 isomer of tetrachlorbenzene.

10. A liquid composition comprising halogenated hydrocarbon compound subject to solidification at natural low temperatures, and at least about ten per cent by weight of tetrachlorbenzene which comprises preponderantly tetrachlorbenzene of the group consisting of the 1,2,3,4 and 1,2,3,5 isomers of such compound.

11. A liquid composition comprising chlorinated diphenyl containing at least about fifty-four per cent chlorine and about ten to forty per cent by weight of material effective to lower the congelation temperature, said material comprising preponderantly tetrachlorbenzene of the group consisting of the 1,2,3,4 and the 1,2,3,5 isomers of such compound.

FRANK M. CLARK.
WALTER M. KUTZ.

CERTIFICATE OF CORRECTION.

Patent No. 2,169,872. August 15, 1939.

FRANK M. CLARK, ET AL.

It is hereby certified that error appears in the printed specification of the above numbered patent requiring correction as follows: Page 2, second column, line 52, for "-15°" read 15°; and that the said Letters Patent should be read with this correction therein that the same may conform to the record of the case in the Patent Office.

Signed and sealed this 12th day of March, A. D. 1940.

(Seal)

Henry Van Arsdale,
Acting Commissioner of Patents.